(12) United States Patent
Fukasawa

(10) Patent No.: US 8,090,197 B2
(45) Date of Patent: Jan. 3, 2012

(54) IMAGE DATA ANALYSIS APPARATUS, IMAGE DATA ANALYSIS METHOD, AND PROGRAM

(75) Inventor: Kenji Fukasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 513 days.

(21) Appl. No.: 12/405,510

(22) Filed: Mar. 17, 2009

(65) Prior Publication Data

US 2009/0238456 A1    Sep. 24, 2009

(30) Foreign Application Priority Data

Mar. 19, 2008 (JP) ................................. 2008-070812
Jul. 25, 2008 (JP) ................................. 2008-191788

(51) Int. Cl.
*G06K 9/00* (2006.01)
(52) U.S. Cl. ....................................... 382/162; 382/167
(58) Field of Classification Search .................. 382/162, 382/167; 348/742; 347/14, 16; 345/601, 345/602; 430/383, 503; 250/205; 257/82; 358/1.9, 501, 515, 518
See application file for complete search history.

(56) References Cited

OTHER PUBLICATIONS

High-Definition Multimedia Interface, Specification Version 1.3a, Nov. 10, 2006, Apendix E Gamut-Related Metadata, pp. 146-152.

*Primary Examiner* — Anh Hong Do
(74) *Attorney, Agent, or Firm* — DLA Piper LLP (US)

(57) ABSTRACT

An image data analysis apparatus adapted to receive color image data having three components for every pixel, detect a color gamut as a range of colors the color image data represents in a predetermined color space, and determine a plurality of apexes defining the color gamut in the color space is disclosed. The image data analysis apparatus includes: a first apex determining unit that detects a minimum grayscale value as a smallest grayscale value among the three components with respect to the pixels included in the color image data, and determines a first apex, which defines the color gamut in the color space, based on the minimum grayscale value; a color image data converting unit that converts the color image data of each of the pixels having the three components into a coordinate point on a predetermined chromaticity plane.

8 Claims, 8 Drawing Sheets

$$RGBmin = Min(R0, G0, B0, R1, G1, B1, \cdots Rn-1, Gn-1, Bn-1)$$

FIG.3A

$$\begin{bmatrix} Ybk \\ Cbbk \\ Crbk \end{bmatrix} = \begin{bmatrix} 0.2126 & 0.7152 & 0.0722 \\ -0.1146 & -0.3854 & 0.5000 \\ 0.5000 & -0.4542 & -0.0458 \end{bmatrix} \begin{bmatrix} RGBmin \\ RGBmin \\ RGBmin \end{bmatrix}$$

⇧ GAMUT ID (Bk POINT)

FIG.3B

RGB ⇨ [INVERSE γ CORRECTION] ⇨ R' G' B'

FIG.4A

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R' \\ G' \\ B' \end{bmatrix}$$

FIG.4B

$$\begin{bmatrix} Xbk \\ Ybk \\ Zbk \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} RGBmin \\ RGBmin \\ RGBmin \end{bmatrix}$$

FIG.5A

$$\begin{bmatrix} X' \\ Y' \\ Z' \end{bmatrix} = \begin{bmatrix} X \\ Y \\ Z \end{bmatrix} - \begin{bmatrix} Xbk \\ Ybk \\ Zbk \end{bmatrix}$$

FIG.5B

$$\begin{cases} x = X'/(X'+Y'+Z') \\ y = Y'/(X'+Y'+Z') \end{cases}$$

$$\begin{cases} X'r / (X'r+Y'r+Z'r) = xr \\ Y'r / (X'r+Y'r+Z'r) = yr \end{cases}$$

FIG.8A $$\begin{cases} X'g / (X'g+Y'g+Z'g) = xg \\ Y'g / (X'g+Y'g+Z'g) = yg \end{cases}$$

FIG.8B $$\begin{cases} X'b / (X'b+Y'b+Z'b) = xb \\ Y'b / (X'b+Y'b+Z'b) = yb \end{cases}$$

FIG.8C $$\begin{cases} \dfrac{(X'r+X'g+X'b)}{(X'r+X'g+X'b+Y'r+Y'g+Y'b+Z'r+Z'g+Z'b)} = 0.313 \\ \dfrac{(Y'r+Y'g+Y'b)}{(X'r+X'g+X'b+Y'r+Y'g+Y'b+Z'r+Z'g+Z'b)} = 0.329 \\ Y'r+Y'g+Y'b = 1.0 - Ybk \end{cases}$$

FIG.8D $$\begin{bmatrix} X \\ Y \\ Z \end{bmatrix} = \begin{bmatrix} X' \\ Y' \\ Z' \end{bmatrix} + \begin{bmatrix} X_{bk} \\ Y_{bk} \\ Z_{bk} \end{bmatrix}$$

FIG. 9

$$\begin{bmatrix} R \\ G \\ B \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix}^{-1} \begin{bmatrix} X \\ Y \\ Z \end{bmatrix}$$

FIG. 10A $$\begin{bmatrix} Y \\ Cb \\ Cr \end{bmatrix} = \begin{bmatrix} 0.2126 & 0.7152 & 0.0722 \\ -0.1146 & -0.3854 & 0.5000 \\ 0.5000 & -0.4542 & -0.0458 \end{bmatrix} \begin{bmatrix} R \\ G \\ B \end{bmatrix}$$

FIG. 10B

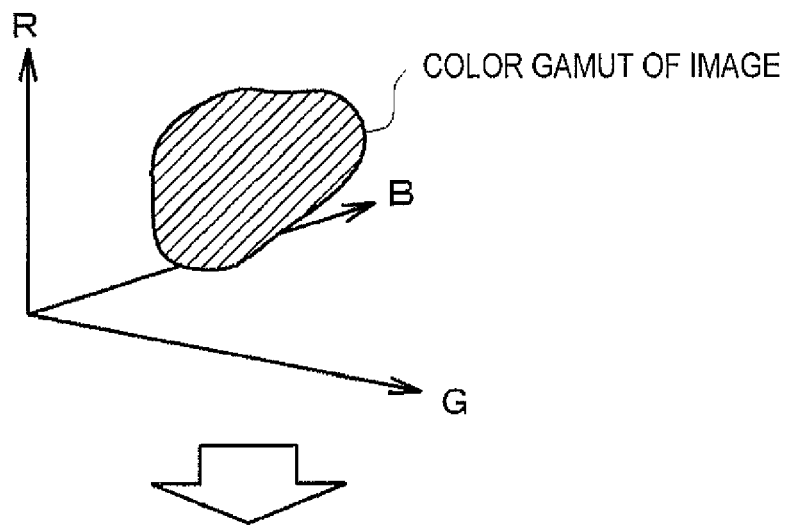
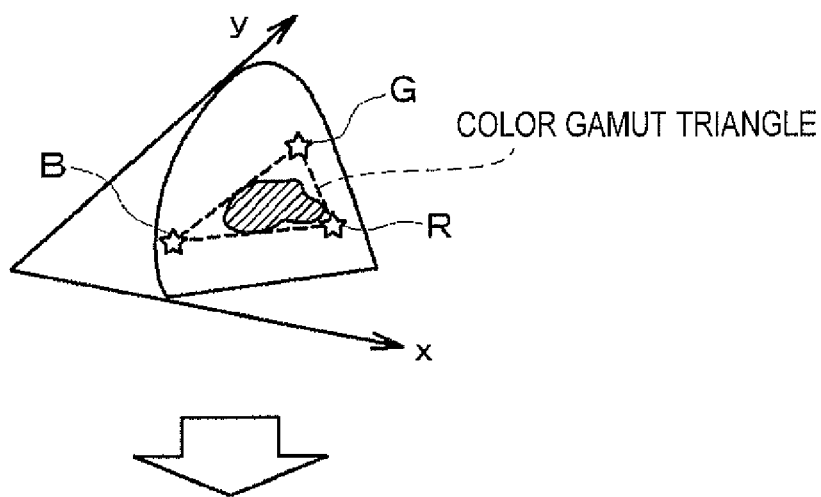
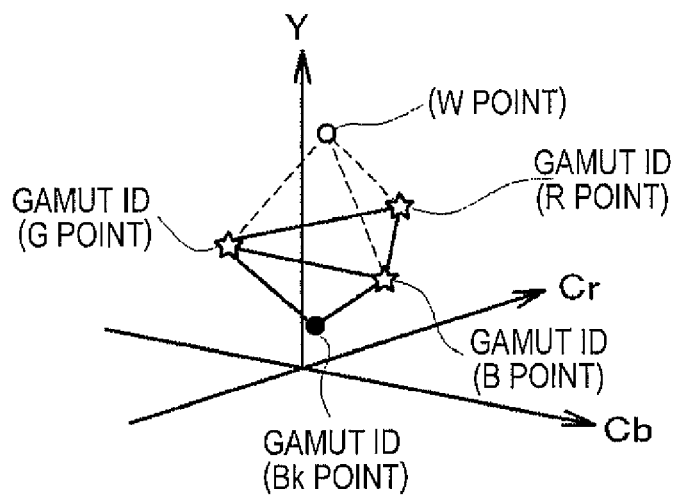
FIG.11

IMAGE DATA ANALYSIS APPARATUS, IMAGE DATA ANALYSIS METHOD, AND PROGRAM

BACKGROUND

1. Technical Field

The present invention relates to a technology of outputting (e.g., displaying and printing) a color image based on image data.

2. Related Art

As apparatuses (image output apparatuses) capable of outputting color images, various apparatuses such as color monitors, projectors, or printing apparatuses are provided in these days. Further, regarding apparatuses (image data generating apparatuses) for generating color image data, there are provided various apparatuses such as digital still cameras or digital video cameras, and further, it becomes also possible to generate color image data on computers using various application programs.

Here, the range (hereinafter referred to as "color gamut of apparatuses" in some cases) of the colors the image output apparatuses can reproduce is not necessarily the same between the image output apparatuses. Further, the range (hereinafter referred to as "color gamut of image data" in some cases) of the colors the color image data can deal with is also not necessarily the same between the image data generation apparatuses or between the application programs. Therefore, the case in which a color the color image data intends to represent cannot be reproduced by a certain image output apparatus (i.e., the color exists out of the color gamut of the image output apparatus) could occur. Further, in such a case, there is required an operation of executing a conversion on the color image data so that the range (hereinafter referred to as "color gamut of an image" in some cases) of the colors included in the color image data falls within the color gamut of the image output apparatus. Such an operation may be called color gamut mapping.

It should be noted that the entire range of the color gamut (i.e., the color gamut of the image data) the color image data can deal with is not necessarily used on a constant basis. Therefore, there exists the color image data in which only the colors within the color gamut (i.e., the color gamut of the apparatus) the image output apparatus can reproduce. Regarding such color image data, it is preferable to directly reproduce the colors the color image data intends to represent. Therefore, there has been proposed a technology intending that the range (i.e., the color gamut of the image) of the colors used in the color image data is searched by analyzing the color image data, and then the color gamut of the image and the color gamut of the image output apparatus are compared, thereby appropriately converting the color image data to display the color image. Further, it is also proposed that, in order for making it possible to quickly display a color image, the color image data is previously analyzed to obtain the color gamut of the image, and then the result is appended to the color image data as metadata (High-Definition Multimedia Interface, Specification Version 1.3a, Nov. 10, 2006, Appendix E).

However, there arises a problem that a large amount of work is required for analyzing the color image data to search the range (i.e., the color gamut of the image) of the colors used in the image data. Therefore, there has been requested development of the technology capable of simply and easily determining the color gamut of the image based on the color image data.

SUMMARY

In view of the problem described above included in the related art, some aspects of the present invention have an advantage of providing a technology capable of quickly determining the range (the color gamut of the image) of the colors used in the color image data by analyzing the color image data.

According to an aspect of the invention, there is provided an image data analysis apparatus adapted to receive color image data having three components for every pixel, detect a color gamut as a range of colors the color image data represents in a predetermined color space, and determine a plurality of apexes defining the color gamut in the color space, including a first apex determining unit that detects a minimum grayscale value as a smallest grayscale value among the three components with respect to the pixels included in the color image data, and determines a first apex, which defines the color gamut in the color space, based on the minimum grayscale value, a color image data converting unit that converts the color image data of each of the pixels having the three components into a coordinate point on a predetermined chromaticity plane, a color gamut triangle detecting unit that detects a color gamut triangle as a triangle including the coordinate points of the color image data converted on the chromaticity plane, a second apex determining unit that determines a second apex defining the color gamut in the color space based on a coordinate value of the apex closest to a reference R (red) point of the apexes of the color gamut triangle, a third apex determining unit that determines a third apex defining the color gamut in the color space based on a coordinate value of the apex closest to a reference G (green) point of the apexes of the color gamut triangle, and a fourth apex determining unit that determines a fourth apex defining the color gamut in the color space based on a coordinate value of the apex closest to a reference B (blue) point of the apexes of the color gamut triangle.

Further, according to another aspect of the invention, there is provided an image data analysis method corresponding to the image data analysis apparatus, adapted to receive color image data having three components for every pixel, detect a color gamut as a range of colors the color image data represents in a predetermined color space, and determine a plurality of apexes defining the color gamut in the color space, including detecting a minimum grayscale value as a smallest grayscale value among the three components with respect to the pixels included in the color image data and determining a first one of the apexes, which defines the color gamut in the color space, based on the minimum grayscale value, converting the color image data of each of the pixels having the three components into a coordinate point on a predetermined chromaticity plane, detecting a color gamut triangle as a triangle having sides parallel to the respective sides of a triangle having a reference R (red) point, a reference G (green) point, and a reference B (blue) point set previously on the chromaticity plane as the apexes, and including all of the coordinate points of the color image data converted on the chromaticity plane, determining a second apex defining the color gamut in the color space based on a coordinate value of the apex closest to the reference R (red) point of the apexes of the color gamut triangle, determining a third apex defining the color gamut in the color space based on a coordinate value of the apex closest to the reference G (green) point of the apexes of the color gamut triangle, and determining a fourth apex defining the color gamut in the color space based on a coordinate value of the apex closest to the reference B (blue) point of the apexes of the color gamut triangle.

In the image data analysis apparatus and the image data analysis method according to the aspects of the invention, when receiving the color image data, the range (the color gamut) of the colors the color image data represents is analyzed by the following method to determine a plurality of apexes defining the color gamut in the color space. Firstly, the smallest grayscale value (the minimum grayscale value) is detected in the pixels of the color image data, and then, the first apex for defining the color gamut in the color space is determined based on the minimum grayscale value. Then, the color image data of each of the pixels is converted into the coordinate point on a predetermined chromaticity plane, and the color gamut triangle including the coordinate points is detected. It should be noted here that the color gamut triangle is set so that the sides thereof are parallel to the respective sides of a triangle obtained by connecting the reference R (red) point, the reference G (green) point, and the reference B (blue) point on the chromaticity plane. Further, as the reference R, G, and B points, the coordinate points corresponding to the R, G, and B colors, which are defined as the references in the standard of the color image data, on the chromaticity plane can be used. By setting the color gamut triangle in the manner described above on the chromaticity plane, the apexes of the color gamut triangle become the reference R, G, and B points with respect to the color image data. Therefore, the coordinate values of the three apexes are obtained on the chromaticity plane to determine the three apexes (i.e., the second through the fourth apexes) in the color space corresponding respectively to the coordinate values.

As described above, in the image data analysis apparatus and the image data analysis method of the aspects of the invention, the color image data is converted into the coordinate points on the chromaticity plane, and the three apexes defining the color gamut on the chromaticity plane are determined. On the chromaticity plane, the apexes for defining the color gamut can far more easily be determined than in the case of the color space. Further, since the apexes defining the color gamut in the color space are determined based on the apexes obtained on the chromaticity plane, it becomes possible to determine the apexes with extreme rapidity.

Further, in the image data analysis apparatus of the aspect of the invention, it is also possible to detect the color gamut triangle including not only the coordinate points to which the pixels of the color image data are converted, but also the reference W (white) point set previously on the chromaticity plane when detecting the color gamut triangle on the chromaticity plane.

In the case in which the colors represented by the color image data happen to have extremely uneven distribution converging around a certain color, there can be caused the case in which it is not suitable to determine the apexes of the color gamut triangle as the R, G, and B points even if the color gamut triangle having the sides parallel to those of the triangle obtained by connecting the reference R, G, and B points on the chromaticity plane is detected. Therefore, by ensuring that the color gamut triangle includes the reference W point, it becomes possible to detect the color gamut triangle with appropriate apexes even in the case in which the colors represented by the color image data have extremely uneven distribution converging around a certain color.

Further, in the image data analysis apparatus of the aspect of the invention described above, it is also possible to use the following conditions when determining the coordinates of the three apexes in the color space from the coordinate of each of the apexes of the color gamut triangle. In other words, it is also possible to determine the second apex, the third apex, and the fourth apex under the condition that the resultant vector obtained by combining the vector from the origin of the color space to the second apex, the vector from the origin to the third apex, and the vector from the origin to the fourth apex matches with an achromatic axis in the color space.

It is convenient that the three apexes corresponding to the R, G, and B points among the apexes defining the color gamut in the color space are determined so that the additive mixture can be applied between the three apexes. Further, to that end, it is possible to arrange that the condition described above is satisfied, namely the resultant vector obtained by combining the vector from the origin of the color space to the second apex, the vector from the origin to the third apex, and the vector from the origin to the fourth apex matches with the achromatic axis in the color space. Therefore, by applying such a condition when determining the coordinates of the three apexes in the color space from the coordinates of the apexes of the color gamut triangle, it becomes possible to appropriately determine the apexes defining the color gamut in the color space.

Further, in the image data analysis apparatus of the aspect of the invention described above, the xy chromaticity plane can also be used as the chromaticity plane for converting the color image data of each of the pixels.

Since the xy chromaticity plane is the most universal plane as the chromaticity plane, by detecting the color gamut triangle on the xy chromaticity plane, it becomes possible to easily execute the process after the detection, namely the process of determining the apexes in the color space from the coordinate values on the chromaticity plane.

Further, in the image data analysis apparatus of the aspect of the invention described above, it is also possible to use the YCbCr color space as the color space for defining the color gamut.

The YCbCr color space is a color space commonly used in the apparatuses for outputting color images. Therefore, by determining the apexes defining the color gamut in the YCbCr color space, it becomes possible to easily execute the process of outputting color images on the apparatus side.

Further, the image data analysis method of the aspect of the invention described above can also be realized using a function of a computer. Therefore, the image data analysis method of the aspect of the invention can be figured out in the form of a computer program described below. Specifically, according to another aspect of the invention, there is provided a program for allowing a computer to realize a method adapted to receive color image data having three components for every pixel, detect a color gamut as a range of colors the color image data represents in a predetermined color space, and determine a plurality of apexes defining the color gamut in the color space, including the steps of determining, after detecting a minimum grayscale value as the smallest grayscale value among the three components with respect to the pixels included in the color image data, a first one of the apexes, which defines the color gamut in the color space, based on the minimum grayscale value, converting the color image data of each of the pixels having the three components into a coordinate point on a predetermined chromaticity plane, detecting a color gamut triangle as a triangle having sides parallel to the respective sides of a triangle having a reference R (red) point, a reference G (green) point, and a reference B (blue) point set previously on the chromaticity plane as the apexes, and including all of the coordinate points of the color image data converted on the chromaticity plane, determining second one of the apexes defining the color gamut in the color space based on a coordinate value of the apex closest to the reference R (red) point of the apexes of the color gamut triangle, determining third one of the apexes defining the color gamut in the color space based on a coordinate value of the apex closest to the reference G (green) point of the apexes of the color gamut triangle, and determining fourth one of the apexes defining the color gamut in the color space based on a coordinate value of the apex closest to the reference B (blue) point of the apexes of the color gamut triangle.

By reading such a program in the computer and making the computer realize the method described above, it becomes possible to analyze the color image data to quickly determine the apexes defining the color gamut represented in the color image data.

Further, the image data analysis apparatus according to an aspect of the invention can be figured out as the following aspect. Specifically, an image data analysis apparatus adapted to receive color image data having three components for every pixel, detect a color gamut as a range of colors the color image data represents in a predetermined color space, and determine a plurality of apexes defining the color gamut in the color space, includes a first apex determining unit that detects a minimum grayscale value as a smallest grayscale value among the three components with respect to the pixels included in the color image data and determines a first apex, which defines the color gamut in the color space, based on the minimum grayscale value, a color image data converting unit that converts the color image data of each of the pixels having the three components into a coordinate point on a predetermined chromaticity plane, a color gamut triangle detecting unit that detects a color gamut triangle as a triangle including all of the coordinate points of the color image data converted on the chromaticity plane, a second apex determining unit that determines a second apex defining the color gamut in the color space based on a coordinate value of the apex closest to a reference R (red) point of the apexes of the color gamut triangle, a third apex determining unit that determines a third apex defining the color gamut in the color space based on a coordinate value of the apex closest to a reference G (green) point of the apexes of the color gamut triangle, and a fourth apex determining unit that determines a fourth apex defining the color gamut in the color space based on a coordinate value of the apex closest to a reference B (blue) point of the apexes of the color gamut triangle.

Also in the image data analysis apparatus according to the aspect of the invention thus figured out, by detecting the color gamut triangle on the chromaticity plane, and determining the three apexes (i.e., the second through the fourth apexes) corresponding to the apexes of the color gamut triangle in the color space, the apexes defining the color gamut can quickly be determined. The color gamut triangle detected by the image data analysis apparatus according to the aspect of the invention can be detected independently of the triangle formed by connecting the reference R (red) point, the reference G (green) point, and the reference B (blue) point on the chromaticity plane. In other words, any color gamut triangle including all of the coordinate points corresponding to the color image data converted on the chromaticity plane can be adopted, and it is not required that the sides of the color gamut triangle are parallel to the respective sides of the triangle formed by connecting the reference R (red) point, the reference G (green) point, and the reference B (blue) point. Therefore, it is possible to detect a compact color gamut triangle, and consequently, it becomes possible to define more compact color gamut also in the color space.

BRIEF DESCRIPTION OF THE DRAWINGS

The invention will now be described with reference to the accompanying drawings, wherein like numbers reference like elements.

FIGS. 3A and 3B are explanatory diagrams showing a method of calculating a Bk point of the gamut ID from the minimum grayscale value of RGB image data.

FIGS. 4A and 4B are explanatory diagrams showing a method of converting coordinate values of RGB color space into coordinate values of XYZ color space.

FIGS. 5A and 5B are explanatory diagrams showing a method of converting coordinate points corresponding respectively to pixels of the RGB image data into coordinate points of a new color space having the Bk point of the gamut ID as the origin.

FIGS. 8A through 8D are explanatory diagrams showing a method of determining the coordinate values in the X'Y'Z' color space from the coordinate values of the apexes of the color gamut triangle.

FIG. 9 is an explanatory diagram showing a method of converting the coordinate values of R, G, and B points in the X'Y'Z' color space into the coordinate values of the XYZ color space.

FIGS. 10A and 10B are explanatory diagrams showing a method of calculating R, G, and B points of the gamut ID from the coordinate values of the R, G, and B points in the XYZ color space.

FIG. 11 is an explanatory diagram showing a general flow of the process of the image data analysis apparatus of the present embodiment generating a gamut ID from color image data.

DESCRIPTION OF EXEMPLARY EMBODIMENTS

Figure 1:
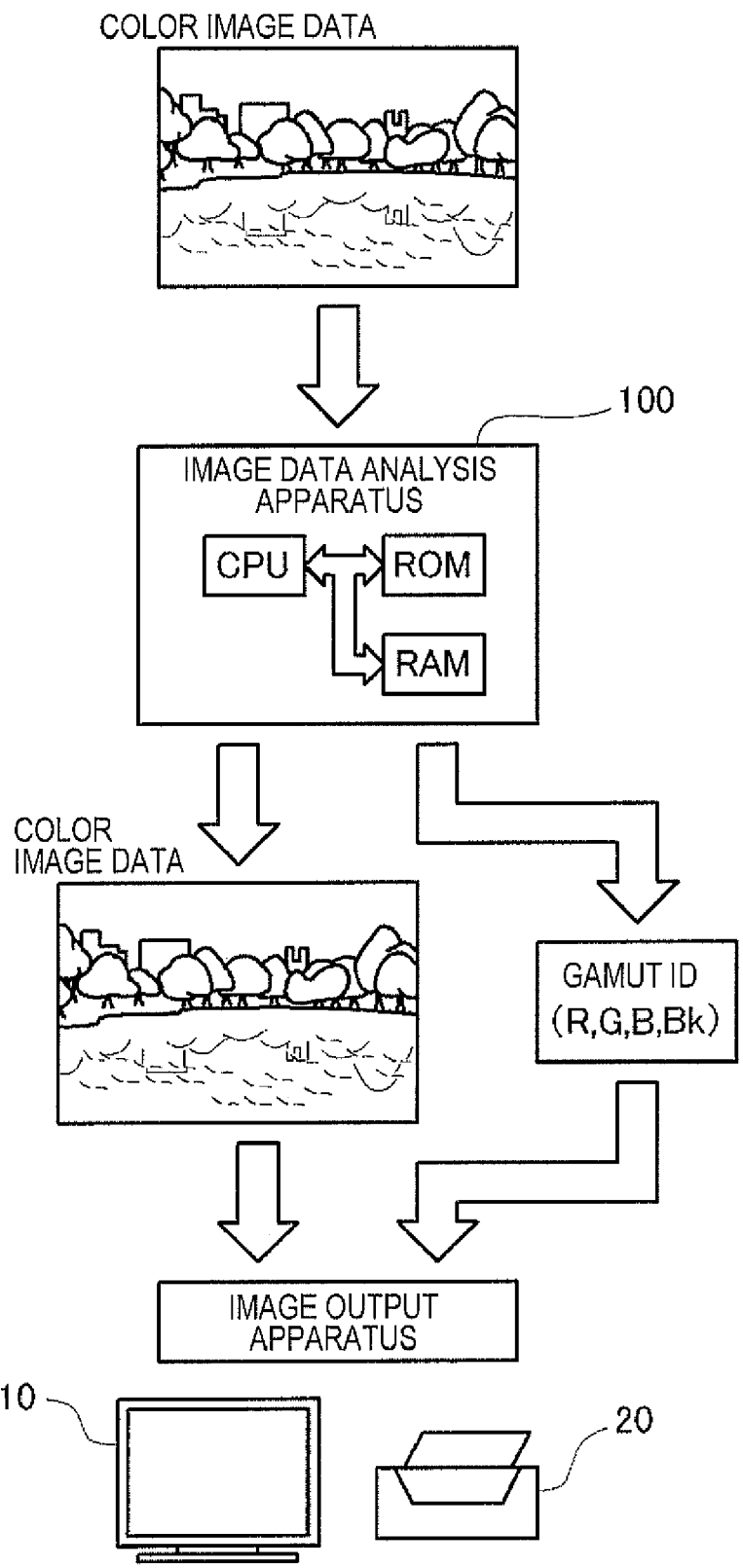
FIG. 1 is an explanatory diagram showing an overall configuration of a system to which an image data analysis apparatus of the present embodiment is applied.

In the description provided below, the embodiment of the invention will be explained along the following order in order for clarifying the contents of the invention described above.
A. Overall Configuration
B. Gamut ID Generation Process
A. Overall Configuration FIG. 1 is an explanatory diagram showing the overall configuration of a system to which an image data analysis apparatus 100 of the present embodiment is applied. The image data analysis apparatus 100 is provided with a CPU, a ROM, a RAM, and so on, so as to communicate data with each other via a bus. When receiving color image data representing a color image from the outside, the image data analysis apparatus 100 analyzes the color image data, thereby detecting a range (color gamut of the image) of the colors used in the color image. Since colors can be represented as coordinates in a color space, the color gamut of the image is formed as an aggregate of the coordinate points disposed inside the color space. Further, assuming a polyhedron including all of the coordinate points, the color gamut of the image can be defined with apexes of the polyhedron.

Although it is also possible to use any polyhedron as such a polyhedron in principle, it is assumed here to use such a hexahedron as being formed with five apexes, namely an apex (R point) representing red in the color space, an apex (G point) representing green, an apex (B point) representing blue, an apex (Bk point) representing black, and an apex (W point) representing white. Further, assuming that the W point among them is determined by a condition of the additive mixture, namely a condition in which a resultant vector of the vectors to the R, G, and B points, respectively, forms the vector to the W point, the color gamut of the image can be defined using the coordinates of the R, G, B, and Bk points, as it turned out.

The image data analysis apparatus 100 according to the present embodiment analyzes the color image data received, thereby detecting the color gamut of the image represented by the color image data, and determining the four apexes, namely the R, G, B, and Bk points defining the color gamut of the image. Further, the image data analysis apparatus 100 supplies the image output apparatus with these apexes as characteristic values (gamut ID) defining the color gamut of the image in conjunction with the color image data. As the image output apparatus, various apparatuses such as a color monitor 10 or a color printer 20 can be used. It is obvious that the color image data and the gamut ID are not limited to be supplied directly from the image data analysis apparatus 100, but can be stored once in a recording medium and then supplied therefrom via the recording medium. Further, although the range (the color gamut of the apparatus) of the colors such image output apparatuses can reproduce is different between the apparatuses, if the color gamut of the image falls in the color gamut of each of the apparatuses with reference to the gamut ID, the same colors can be reproduced without being affected by the difference in the color gamut between the apparatuses.

Here, since the image data analysis apparatus 100 according to the present embodiment uses a particular method in analyzing the color image data to generate the gamut ID, it is possible to quickly generate the gamut ID while keeping sufficiently practical accuracy. Hereinafter, a process of the image data analysis apparatus 100 according to the present embodiment analyzing the color image data to generate the gamut ID will be explained.

B. Gamut ID Generation Process

Figure 2:
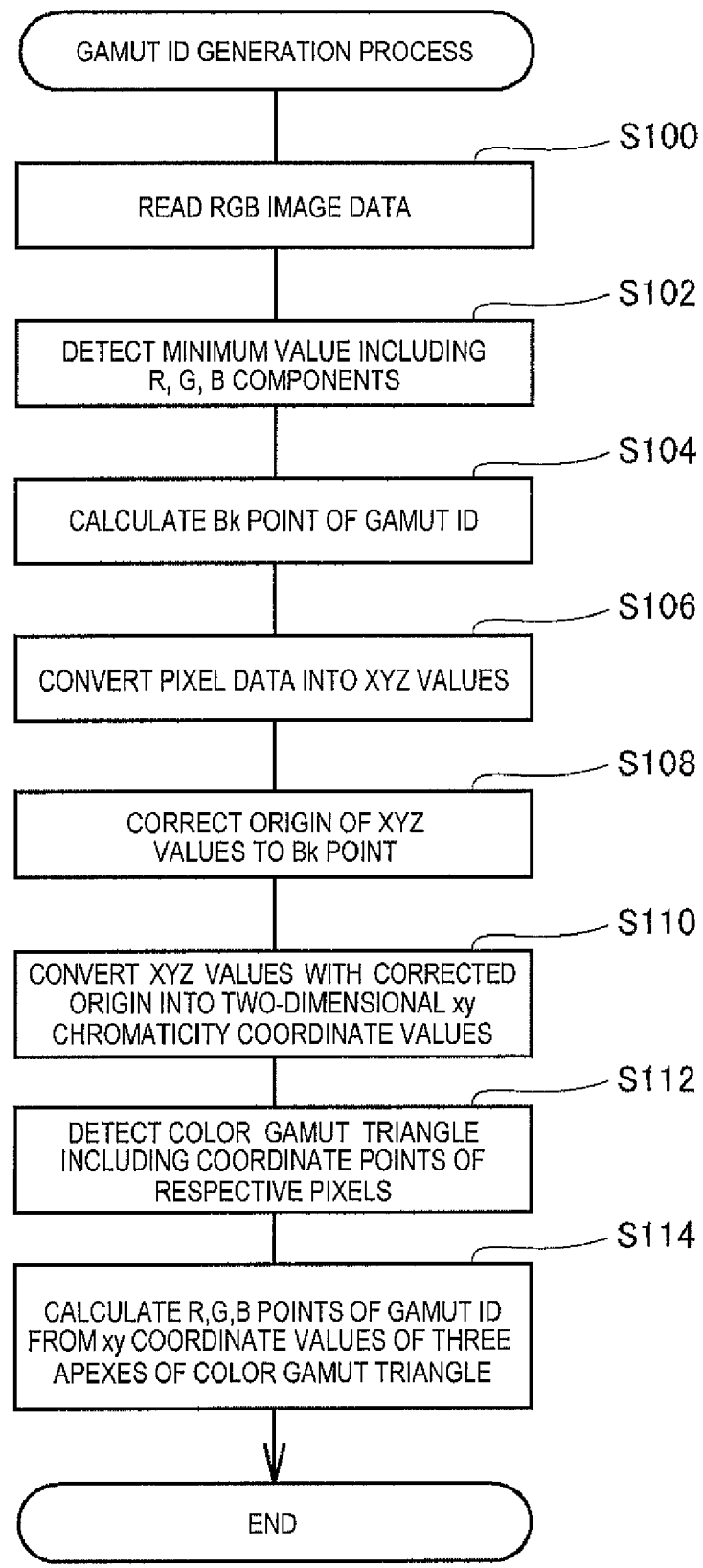
FIG. 2 is a flowchart showing a flow of a process of the image data analysis apparatus of the present embodiment generating a gamut ID from color image data.

FIG. 2 is a flowchart showing a flow of the process of the image data analysis apparatus 100 of the present embodiment generating the gamut ID from the color image data. In the gamut ID generation process, firstly the color image data to be analyzed is read (step S100). Although image data with various forms can be used as the color image data, it is assumed here that RGB image data, which describes grayscale values of the respective R, G, and B components for every pixel, is read.

Subsequently, the minimum grayscale value, which is the smallest grayscale value of the R, G, and B components of all of the pixels thus read, is detected (step S102), and then the Bk point of the gamut ID is calculated based on the minimum grayscale value (step S104). FIGS. 3A and 3B are explanatory diagrams showing the method of calculating the Bk point of the gamut ID from the minimum grayscale value of RGB image data. FIG. 3A shows a calculation formula for obtaining the minimum grayscale value RGBmin. It is assumed here that the color image data is composed of n pixels, the R, G, and B components of the 0th pixel are R0, G0, and B0, and the R, G, and B components of the 1st pixel are R1, G0, and B1, respectively. Assuming similarly to the above that the R, G, and B components of the n−1th pixel are Rn−1, Gn−1, and Bn−1, respectively, the minimum grayscale value RGBmin is obtained as the smallest grayscale value of all of these components.

After the minimum grayscale value RGBmin is thus obtained, the coordinate point in which each of the R, G, and B components takes the minimum grayscale value RGBmin is determined as the Bk point defining the color gamut of the image. Although the coordinate values of the Bk point are obtained as those of the coordinate point in the RGB color space, it is assumed here that the gamut ID is represented using the coordinate values in the YCbCr color space. Conversion from the coordinate values of the RGB color space to the coordinate values of the YCbCr color space can be executed along the conversion formula shown in FIG. 3B. In the step S102 and the step S104 shown in FIG. 2, the Bk point of the gamut ID is determined in the manner described above.

After the Bk point of the gamut ID is obtained, then the process of determining the R, G, and B points of the gamut ID is started. When determining the other gamut ID, firstly the ROB image data of each of the pixels is converted into the coordinate values of an XYZ color space (step S106). It should be noted here that the XYZ color space denotes a color space defined by the International Commission on Illumination (CIE), and the conversion from the coordinate values of the RGB color space to the coordinate values of the XYZ color space can be executed by a predetermined conversion formula.

FIGS. 4A and 4B show the method of converting the coordinate values of the RGB color space into the coordinate values of the XYZ color space. Since the RGB image data is treated with the gamma correction in consideration of the characteristic of the monitor or the like, the inverse gamma correction is firstly executed thereon to convert it into the RGB image data on which the gamma correction has not yet been executed. It is assumed here that the R, G, and B components of the RGB image data before the gamma correction are represented as R', G', and B', respectively. After the R', G', and B' are thus obtained, it is possible to convert the coordinate values of the RGB color space into the coordinate values of the XYZ color space along the conversion formula determined by the International Commission on Illumination (CIE) shown in FIG. 4B. In the step S106 shown in FIG. 2, each of the pixels of the RGB image data is converted in to the coordinate point of the XYZ color space in the manner described above.

Subsequently, the origin of the XYZ color space is moved to the Bk point of the gamut ID to set a new color space (X'Y'Z'), and the coordinate points corresponding respectively to the pixels of the RGB image data are converted into the coordinate points in the X'Y'Z' color space (step S108) FIGS. 5A and 5B are explanatory diagrams showing the method of converting the coordinate points corresponding respectively to the pixels of the RGB image data into the coordinate points of the new color space having the Bk point of the gamut ID as the origin. As described above with reference to FIGS. 3A and 3B, the Bk point of the gamut ID corresponds to the coordinate point in which each of the R, G, and B components has the minimum grayscale value RGBmin in the RGB color space. Therefore, the coordinate values (Xbk, Ybk, Zbk) of the XYZ color space can be obtained by the calculation formula shown in FIG. 5A. Further, the conversion from the XYZ color space to the X'Y'Z' color space having the coordinate values as the origin can be executed by the conversion formula shown in FIG. 5B. In the step S108 shown in FIG. 2, the process of converting the coordinate points in the XYZ color space into the coordinate points in the X'Y'Z' color space having the Bk point of the gamut ID as the origin is executed in the manner described above.

Figures 6A, 6B:
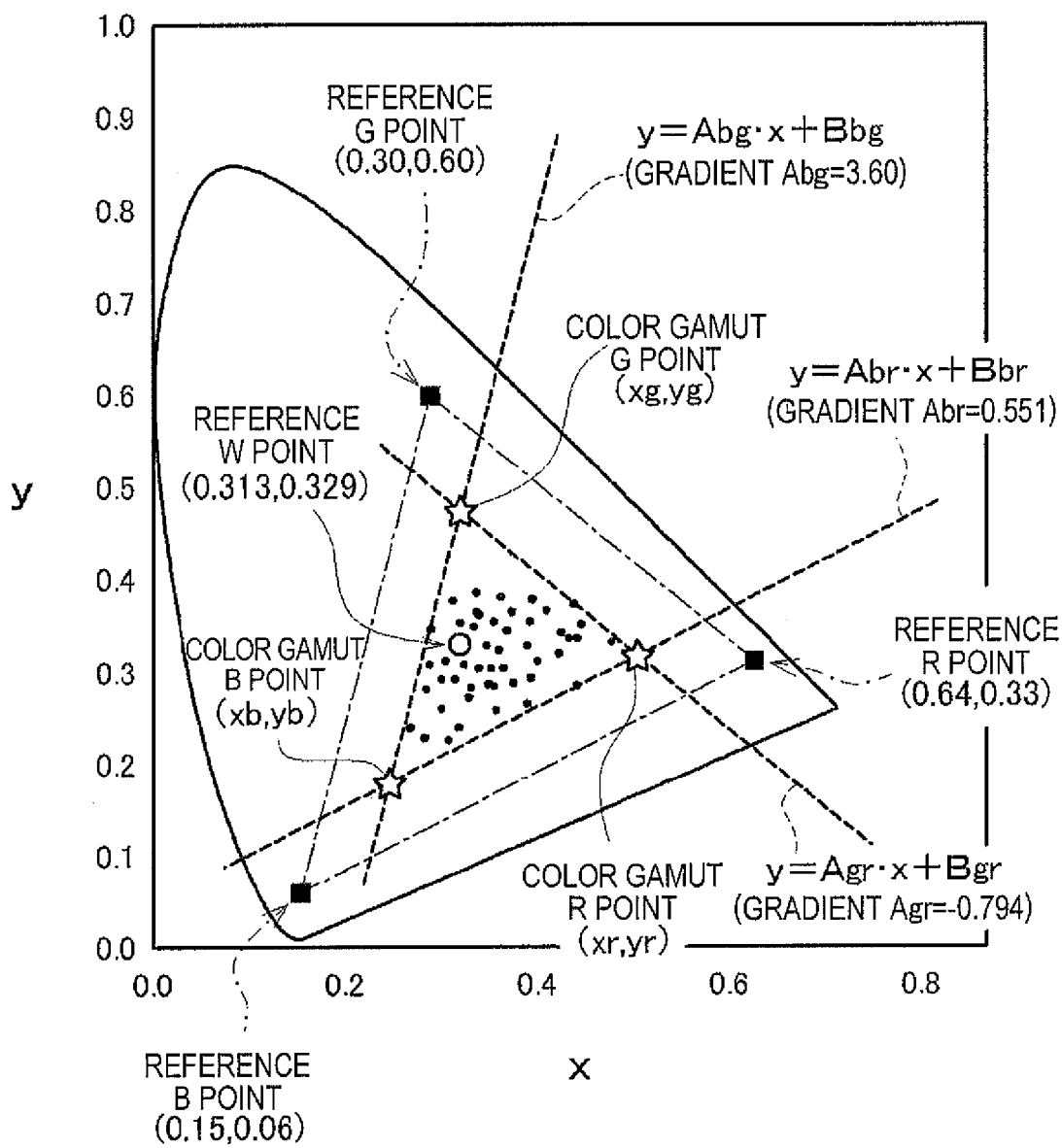
FIGS. 6A and 6B are explanatory diagrams showing a process of converting coordinate points of pixels in X'Y'Z' color space into coordinate values on a two-dimensional xy chromaticity plane.

Subsequently, the coordinate point of each of the pixels in the X'Y'Z' color space is converted into coordinate values on a two-dimensional xy chromaticity plane (step S110). In the conversion, the conversion formula from the XYZ coordinate values into the xy coordinate values is used directly. FIGS. 6A and 6B are explanatory diagrams showing the process of converting the coordinate point of each of the pixels in the X'Y'Z' color space into the coordinate values on the two-dimensional xy chromaticity plane. FIG. 6A shows a conversion formula used for converting it into the coordinate values on the xy chromaticity plane. Further, in FIG. 6B, the coordinate points corresponding respectively to the pixels of the RGB color image data are displayed with small black circles. It should be noted that although the explanation is presented here assuming that all of the pixels of the color image data are converted into the coordinate points on the xy chromaticity plane, it is not necessarily required to convert all of the pixels, but it is also possible to skip the conversion of the pixel every few pixels. Since the number of pixels to be processed is reduced in this case, the process can quickly be executed accordingly.

After converting the color image data of each of the pixels is thus converted into the coordinate point on the xy chromaticity plane, a triangle (a color gamut triangle) including these coordinate points is detected (step S112). In the present embodiment, the triangle as described below is used as the color gamut triangle. Firstly, it is assumed that the sides of the color gamut triangle are parallel to the respective sides of the triangle having the reference R, G, and B points as the apexes thereof. It should be noted here that the reference R point denotes the coordinate point of the color R, which is defined as the reference for representing the RGB color image data, represented on the xy chromaticity plane. In a similar manner, the reference G point denotes the coordinate point of the color G, which is defined as the reference for representing the RGB color image data, represented on the xy chromaticity plane, and the reference B point denotes the coordinate point of the color B, which is defined as the reference for representing the RGB color image data, represented on the xy chromaticity plane. Secondly, it is assumed that the color gamut triangle includes the reference W point. It should be noted here that the reference W point denotes the coordinate point defined as the point corresponding to white on the xy chromaticity plane.

Such a color gamut triangle can be determined in the following manner. Firstly, since the coordinates of the reference R point, the reference G point, and the reference B point are known, the gradients of the straight lines connecting these three points can easily be obtained. Here, it is assumed that the gradient of the straight line connecting the reference B point and the reference R point is Abr, the gradient of the straight line connecting the reference B point and the reference G point is Abg, and the gradient of the straight line connecting the reference G point and the reference R point is Agr. These gradients correspond respectively to the gradients of the three sides of the color gamut triangle. Therefore, the side among the sides of the color gamut triangle, parallel to the straight line connecting the reference B point and the reference R point is determined. Assuming the equation of the straight line representing the side as $y=Abr \cdot x+Bbr$, the maximum value of the Bbr, with which the straight line passes under the coordinate points of all of the pixels and the W point, is adopted as the Bbr.

Then, the side among the sides of the color gamut triangle, parallel to the straight line connecting the reference B point and the reference G point is determined. Assuming the equation of the straight line representing the side as $y=Abg \cdot x+Bbg$, the minimum value of the Bbg, with which the straight line passes above the coordinate points of all of the pixels and the W point, is adopted as the Bbg. Finally, the side among the sides of the color gamut triangle, parallel to the straight line connecting the reference G point and the reference R point is determined. Assuming the equation of the straight line representing the side as $y=Agr \cdot x+Bgr$, the minimum value of the Bgr, with which the straight line passes above the coordinate points of all of the pixels and the W point, is adopted as the Bgr.

After the equations (i.e., $y=Abr \cdot x+Bbr$, $y=Abg \cdot x+Bbg$, and $y=Agr \cdot x+Bgr$) of the straight lines respectively representing the three sides of the color gamut triangle are obtained in the manner described above, the R, G, and B points of the color gamut triangle are obtained as the intersection points thereof. It should be noted that the R, G, and B points thus obtained may be referred to as a color gamut R point, a color gamut G point, and a color gamut B point in order for distinguishing them from the reference R, G, and B points, respectively. Further, it is hereinafter assumed that the coordinate values of the color gamut R point are (xr, yr), the coordinate values of the color gamut G point are (xg, yg), and the coordinate values of the color gamut B point are (xb, yb). In the step S112 shown in FIG. 2, the process of calculating the coordinate values of the three apexes of the color gamut triangle is executed in the manner described above.

Figure 7:
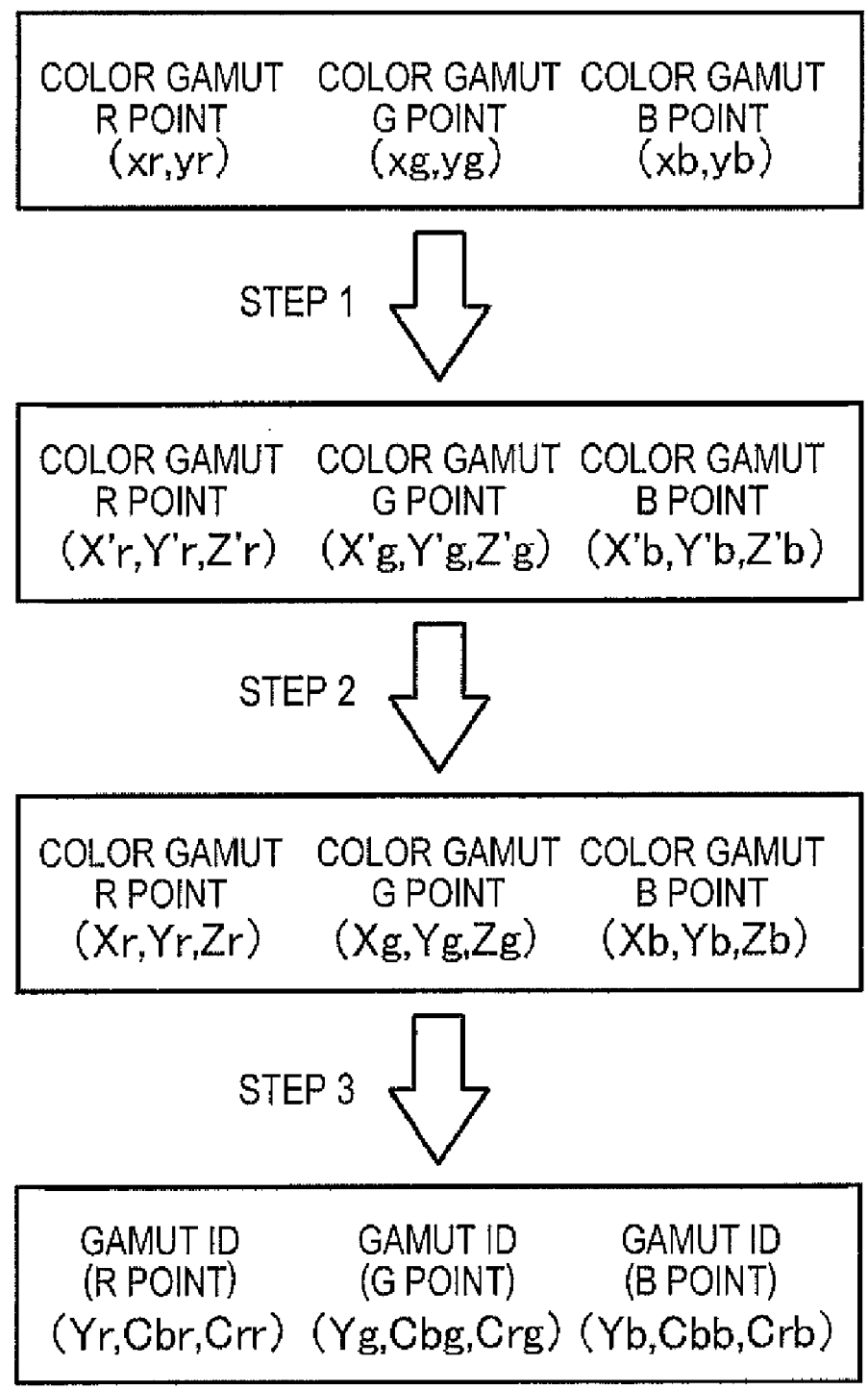
FIG. 7 is an explanatory diagram showing a general procedure of a method of determining the gamut ID from the three apexes of the color gamut triangle.

Subsequently, the R, G, and B points of the gamut ID are determined from the coordinate values of the three apexes of the color gamut triangle (step S114). In other words, the three-dimensional coordinate values in the YCbCr color space are determined from the two-dimensional coordinate values on the xy chromaticity plane. FIG. 7 is an explanatory diagram showing a general procedure of a method of determining the gamut ID from the three apexes of the color gamut triangle. Hereinafter, the method of determining the gamut ID will be explained along FIG. 7.

As shown in FIG. 7, the R, G, and B points obtained on the xy chromaticity plane are converted into the R point (X'r, Y'r, Z'r), the G point (X'g, Y'g, Z'g), and the B point (X'b, Y'b, Z'b) in the X'Y'Z' color space. It should be noted here that the R, G, and B points in the X'Y'Z' color space are the points as described below. As described above with reference to FIGS. 6A and 6B, the coordinate values on the xy chromaticity plane are obtained by converting the three-dimensional coordinate values in the X'Y'Z' color space using the conversion formula shown in FIG. 6A. Therefore, it is possible to consider the coordinate points in the X'Y'Z' color space to be converted into the R, G, and B points on the xy chromaticity plane using the conversion formula shown in FIG. 6A in a similar manner. The R, G, and B points in the X'Y'Z' color space ate such points as described above. The R point (X'r, Y'r, Z'r) the G point (X'g, Y'g, Z'g), and the B point (X'b, Y'b, Z'b) in the X'Y'Z' color space can be determined in the following manner.

FIGS. 8A through 8D are explanatory diagrams showing a method of determining the coordinate values in the X'Y'Z' color space from the coordinate values of the apexes of the color gamut triangle. Firstly, since the R point (X'r, Y'r, Z'r) in the X'Y'Z' color space has been converted into the R point (xr, yr) on the xy chromaticity plane by the conversion formula shown in FIG. 6A, the formula shown in FIG. 8A must be true. Similarly, since the G point (X'g, Y'g, Z'g) in the X'Y'Z' color space has been converted into the G point (xg, yg) on the xy chromaticity plane, the formula shown in FIG. 8B is true. Further, since the B point (X'b, Y'b, Z'b) in the X'Y'Z' color space has been converted into the B point (xb, yb) on the xy chromaticity plane, the formula shown in FIG. 8C is true. In addition, assuming that the additive mixture can be applied between the R, G, and B points in the X'Y'Z' color space (i.e., the resultant vector of the vectors from the origin to the R, G, and B points is directed toward the W point), the formula shown in FIG. 8D is true. Here, there are nine unknown variables, namely X'r, Y'r, Z'r, X'g, Y'g, Z'g, X'b, Y'b, and Z'b, and there have been obtained nine equations shown in FIGS. 8A through 8D, and therefore, by solving the equations, the R point (X'r, Y'r, Z'r), the G point (X'g, Y'g, Z'g), and the B point (X'b, Y'b, Z'b) in the X'Y'Z' color space can be determined. In the conversion of the step 1 shown in FIG. 7, the process of calculating the coordinate values of the R, G, and B points in the X'Y'Z' color space from the coordinates of the apexes of the color gamut triangle obtained on the xy chromaticity plane is executed in the manner described above.

Subsequently, the coordinate values of the X'Y'Z' color space are converted into the coordinate values of the XYZ color space. Specifically, since the X'Y'Z' color space is the color space obtained by setting the origin at the Bk point determined for every color image as described above with reference to FIGS. 5A and 5B, the X'Y'Z' color space is converted into a general XYZ color space. The conversion formula shown in FIG. 9 can be used for the conversion described above. It should be noted that the conversion formula shown in FIG. 9 is formed as a formula for executing the reverse conversion of the formula shown in FIG. 5B. In the conversion of the step 2 shown in FIG. 7, the process of converting the coordinate values in the X'Y'Z' color space into the coordinate values of the XYZ color space is executed in the manner described above.

After the coordinate values in the general XYZ color space are thus obtained, the coordinate values are converted into the coordinate values in the YCbCr color space, thereby calculating the gamut ID. The conversion formula defined by the International Commission on Illumination (CIE) can be used for this conversion. Specifically, the coordinate values in the XYZ color space are converted into the coordinate values in the RGB color space using the conversion formula shown in FIG. 10A. Subsequently, the coordinate values in the RGB color space thus obtained can be converted into the coordinate values in the YCbCr color space using the conversion formula shown in FIG. 10B. In the manner described above, by converting the coordinate values of the R, G, and B points in the XYZ color space into the coordinate values in the YCbCr color space, it is possible to determine the R point (Yr, Cbr, Crr), the G point (Yg, Cbg, Crg), and the B point (Yb, Cbb, Crb) of the gamut ID. In the conversion of the step 3 shown in FIG. 7, the R, G, and B points of the gamut ID are calculated from the coordinate values of the R, G, and B points in the XYZ color space in the manner described above. Subsequently, after the R, G, and B points of the gamut ID are obtained (step S114 shown in FIG. 2), since all of the gamut ID including the Bk point of the gamut ID obtained previously have been obtained, the gamut ID generation process shown in FIG. 2 is terminated.

As explained hereinabove, when receiving the color image data, the image data analysis apparatus 110 of the present embodiment can quickly generate the gamut ID of the color image data. This point will supplementarily be explained below.

FIG. 11 is an explanatory diagram showing a general flow of the process of the image data analysis apparatus 100 of the present embodiment generating the gamut ID from the color image data. When receiving the color image data as described above, the image data analysis apparatus 100 of the present embodiment converts the image data of each pixel into the coordinate point on the two-dimensional chromaticity plane. In the middle stage of FIG. 11, the range in which the coordinate points are distributed on the xy chromaticity plane is illustrated as a closed region with hatching. Subsequently, the triangle (the color gamut triangle) including the distribution of the coordinate points is determined. Then, after the color gamut triangle is thus determined, the apexes are converted into the coordinate points in the color space (the YCbCr color space here) to generate the gamut ID.

Although the process of converting the color image data into the coordinate points on the two-dimensional chromaticity plane is required to be executed on a number of pixels, the process is nothing more than a process of converting three-dimensional coordinates down into two-dimensional coordinates after all, and therefore, can quickly be executed. Further, after determining the color gamut triangle on the two-dimensional chromaticity plane, it is enough to convert the coordinates of the three apexes of the color gamut triangle instead of the image data of each pixel into the coordinate points of the color space, and therefore, it becomes possible to generate the gamut ID with extreme rapidity.

Although the image data analysis apparatus of the present embodiment is explained hereinabove, the invention is not limited to the entire embodiment described above, but can be put into practice in various forms within the scope or spirit of the invention.

For example, although it is assumed that the minimum grayscale value as the smallest grayscale value of the R, G, and B components of all of the pixels read is detected in the step S102 of the flowchart of the gamut ID generation process shown in FIG. 2, all of the pixels are not necessarily required, but it is also possible to detect the minimum grayscale value in the R, G, and B components of some pixels of all of the pixels read, such as the pixels reduced by skipping one every few pixels.

What is claimed is:

1. An image data analysis apparatus adapted to receive color image data having three components for every pixel, detect a color gamut as a range of colors the color image data represents in a predetermined color space, and determine a plurality of apexes defining the color gamut in the color space, the image data analysis apparatus comprising:

a first apex determining unit that detects a minimum grayscale value as a smallest grayscale value among the three components with respect to the pixels included in the color image data, and determines a first apex, which defines the color gamut in the color space, based on the minimum grayscale value;

a color image data converting unit that converts the color image data of each of the pixels having the three components into a coordinate point on a predetermined chromaticity plane; a color gamut triangle detecting unit that detects a color gamut triangle as a triangle including the coordinate points of the color image data converted on the chromaticity plane;

a second apex determining unit that determines a second apex defining the color gamut in the color space based on a coordinate value of the apex closest to a reference R (red) point of the apexes of the color gamut triangle;

a third apex determining unit that determines a third apex defining the color gamut in the color space based on a coordinate value of the apex closest to a reference G (green) point of the apexes of the color gamut triangle; and a fourth apex determining unit that determines a fourth apex defining the color gamut in the color space based on a coordinate value of the apex closest to a reference B (blue) point of the apexes of the color gamut triangle.

2. The image data analysis apparatus according to claim 1, wherein
the color gamut triangle detecting unit detects the color gamut triangle including a reference W (white) point set previously on the chromaticity plane.

3. The image data analysis apparatus according to claim 1, wherein
the second apex determining unit, the third apex determining unit, and the fourth apex determining unit respectively determine the second apex, the third apex, and the fourth apex so that a resultant vector obtained by combining a vector from an origin of the color space to the second apex, a vector from the origin to the third apex, and a vector from the origin to the fourth apex matches with an achromatic axis in the color space.

4. The image data analysis apparatus according to claim 1, wherein
the color image data converting unit converts the color image data of each of the pixels into coordinate point on an xy chromaticity plane.

5. The image data analysis apparatus according to claim 1, wherein
the first apex determining unit, the second apex determining unit, the third apex determining unit, and the fourth apex determining unit respectively determine the first apex, the second apex, the third apex, and the fourth apex in a YCbCr color space.

6. An image data analysis method adapted to receive color image data having three components for every pixel, detect a color gamut as a range of colors the color image data represents in a predetermined color space, and determine a plurality of apexes defining the color gamut in the color space, the image data analysis method comprising:
executing by a computer processor the following steps:
detecting a minimum grayscale value as a smallest grayscale value among the three components with respect to the pixels included in the color image data, and determining a first apex, which defines the color gamut in the color space, based on the minimum grayscale value;
converting the color image data of each of the pixels having the three components into a coordinate point on a predetermined chromaticity plane;
detecting a color gamut triangle as a triangle having sides parallel to the respective sides of a triangle having a reference R (red) point, a reference G (green) point, and a reference B (blue) point set previously on the chromaticity plane as the apexes, and including all of the coordinate points of the color image data converted on the chromaticity plane;
determining a second apex defining the color gamut in the color space based on a coordinate value of the apex closest to the reference R (red) point of the apexes of the color gamut triangle;
determining a third apex defining the color gamut in the color space based on a coordinate value of the apex closest to the reference G (green) point of the apexes of the color gamut triangle; and
determining a fourth apex defining the color gamut in the color space based on a coordinate value of the apex closest to the reference B (blue) point of the apexes of the color gamut triangle.

7. A non-transitory computer-readable storage medium recorded with a program that cause a computer to realize a method adapted to receive color image data having three components for every pixel, detect a color gamut as a range of colors the color image data represents in a predetermined color space, and determine a plurality of apexes defining the color gamut in the color space, the method comprising:
detecting a minimum grayscale value as a smallest grayscale value among the three components with respect to the pixels included in the color image data, and determining a first apex, which defines the color gamut in the color space, based on the minimum grayscale value;
converting the color image data of each of the pixels having the three components into a coordinate point on a predetermined chromaticity plane;
detecting a color gamut triangle as a triangle having sides parallel to the respective sides of a triangle having a reference R (red) point, a reference G (green) point, and a reference B (blue) point set previously on the chromaticity plane as the apexes, and including all of the coordinate points of the color image data converted on the chromaticity plane; determining a second apex defining the color gamut in the color space based on a coordinate value of the apex closest to the reference R (red) point of the apexes of the color gamut triangle;
determining a third apex defining the color gamut in the color space based on a coordinate value of the apex closest to the reference G (green) point of the apexes of the color gamut triangle; and
determining a fourth apex defining the color gamut in the color space based on a coordinate value of the apex closest to the reference B (blue) point of the apexes of the color gamut triangle.

8. An image data analysis apparatus adapted to receive color image data having three components for every pixel, detect a color gamut as a range of colors the color image data represents in a predetermined color space, and determine a plurality of apexes defining the color gamut in the color space, the image data analysis apparatus comprising:
a first apex determining unit that detects a minimum grayscale value as a smallest grayscale value among the three components with respect to the pixels included in the color image data, and determines a first apex, which defines the color gamut in the color space, based on the minimum grayscale value;
a color image data converting unit that converts the color image data of each of the pixels having the three components into a coordinate point on a predetermined chromaticity plane;
a color gamut triangle detecting unit that detects a color gamut triangle as a triangle including all of the coordinate points of the color image data converted on the chromaticity plane;
a second apex determining unit that determines a second apex defining the color gamut in the color space based on a coordinate value of the apex closest to a reference R (red) point of the apexes of the color gamut triangle;
a third apex determining unit that determines a third apex defining the color gamut in the color space based on a coordinate value of the apex closest to a reference G (green) point of the apexes of the color gamut triangle; and
a fourth apex determining unit that determines a fourth apex defining the color gamut in the color space based on a coordinate value of the apex closest to a reference B (blue) point of the apexes of the color gamut triangle.

* * * * *